(12) United States Patent
Yan

(10) Patent No.: US 11,346,960 B2
(45) Date of Patent: May 31, 2022

(54) METHODS AND MOBILE DEVICES WITH ELECTRIC VEHICLE TRANSPORTATION DETECTION

(71) Applicant: CM HK Limited, Fortress Hill (HK)

(72) Inventor: Long-Jhe Yan, Taipei (TW)

(73) Assignee: CM HK LIMITED, Fortress Hill (HK)

(*) Notice: Subject to any disclaimer, the term of this patent is extended or adjusted under 35 U.S.C. 154(b) by 0 days.

(21) Appl. No.: 16/695,566

(22) Filed: Nov. 26, 2019

(65) Prior Publication Data

US 2020/0096650 A1 Mar. 26, 2020

Related U.S. Application Data

(63) Continuation of application No. 15/454,175, filed on Mar. 9, 2017, now Pat. No. 10,527,736.

(Continued)

(51) Int. Cl.
*G01S 19/49* (2010.01)
*G01C 21/16* (2006.01)
(Continued)

(52) U.S. Cl.
CPC ............ *G01S 19/49* (2013.01); *G01C 21/005* (2013.01); *G01C 21/165* (2013.01); *G01C 22/00* (2013.01); *G01S 19/26* (2013.01); *G01S 19/34* (2013.01)

(58) Field of Classification Search
CPC .......... G01S 19/49; G01S 19/26; G01S 19/34; G01S 19/13; G01C 21/005; G01C 21/165; G01C 21/28; G01C 22/00; G01C 15/00

(Continued)

(56) References Cited

U.S. PATENT DOCUMENTS 8,700,355 B2  4/2014 Sambongi et al.
9,128,112 B2  9/2015 Fujiwara
(Continued)

FOREIGN PATENT DOCUMENTS

CN 102435187 A 5/2012
CN 103675928 A 3/2014

OTHER PUBLICATIONS

CN Office Action dated Apr. 2, 2019, Application No. 201710164477.7, pp. 1-8.

*Primary Examiner* — Harry K Liu
(74) *Attorney, Agent, or Firm* — McClure, Qualey & Rodack, LLP

(57) ABSTRACT

Methods and mobile devices with electric vehicle transportation detection are provided. A representative method includes: determining whether GPS locations, based on GPS signals from a GPS receiver, are indicative of the mobile device moving; receiving the acceleration signals from the accelerometer; determining a first step distance over a first time span based on the acceleration signals and the GPS signals; determining a second step distance over a second time span based on the acceleration signals and the GPS signals, the second time span being subsequent to the first time span; and determining whether the first step distance and the second step distance correspond to a predetermined step-distance threshold such that, if both of the first step distance and the second step distance correspond to the predetermined step-distance threshold, the processor sets the status of the mobile device to the in-moving-vehicle status.

14 Claims, 10 Drawing Sheets

Related U.S. Application Data

(60) Provisional application No. 62/309,463, filed on Mar. 17, 2016.

(51) Int. Cl.
  *G01C 21/00* (2006.01)
  *G01C 22/00* (2006.01)
  *G01S 19/26* (2010.01)
  *G01S 19/34* (2010.01)

(58) Field of Classification Search
  USPC .................................................. 342/357.32
  See application file for complete search history.

(56) References Cited

U.S. PATENT DOCUMENTS

| | | | | |
|---|---|---|---|---|
| 9,191,897 | B2 * | 11/2015 | Morrison | G01S 19/34 |
| 9,283,847 | B2 * | 3/2016 | Riley, Sr. | A61B 5/163 |
| 9,619,721 | B2 * | 4/2017 | Bogner | B60W 50/16 |
| 9,710,717 | B1 * | 7/2017 | Sanchez | B60W 40/09 |
| 9,836,062 | B1 * | 12/2017 | Hayward | G06Q 40/08 |
| 9,888,392 | B1 * | 2/2018 | Snyder | H04W 4/44 |
| 9,964,661 | B2 | 5/2018 | Fujiwara et al. | |
| 10,013,610 | B2 * | 7/2018 | Chen | G06K 9/4652 |
| 10,462,745 | B2 * | 10/2019 | Desai | H04W 52/0254 |
| 2012/0072528 | A1 * | 3/2012 | Rimae | H04N 21/64746 709/217 |
| 2014/0019044 | A1 * | 1/2014 | Zanutta | G01S 19/34 701/469 |
| 2014/0163870 | A1 * | 6/2014 | Riley | G01S 5/0072 701/470 |
| 2014/0309790 | A1 * | 10/2014 | Ricci | G01C 21/3697 700/276 |
| 2015/0087332 | A1 * | 3/2015 | Pijl | H04W 4/027 455/456.1 |
| 2015/0282759 | A1 * | 10/2015 | Lin | G16H 20/30 600/301 |
| 2016/0245655 | A1 * | 8/2016 | Ruizenaar | G01C 21/165 |
| 2016/0349376 | A1 * | 12/2016 | Kazemi | G01S 19/34 |

* cited by examiner

METHODS AND MOBILE DEVICES WITH ELECTRIC VEHICLE TRANSPORTATION DETECTION

CROSS REFERENCE TO RELATED APPLICATION

This utility application is a Continuation of pending U.S. patent application Ser. No. 15/454,175, filed on Mar. 9, 2017, which claims the benefit of and priority to US provisional application 62/309,463, filed on 17 Mar. 2016, the entirety of each of which is incorporated by reference herein.

BACKGROUND

Technical Field

The disclosure involves determining whether a user of a mobile device is located within an electric vehicle.

Description of the Related Art

Various devices incorporate sensors that determine position and/or motion associated with the device. However, it is often difficult to discriminate among various types of motion, such as whether the user of such a device is walking in contrast to being embarked on an electric vehicle.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
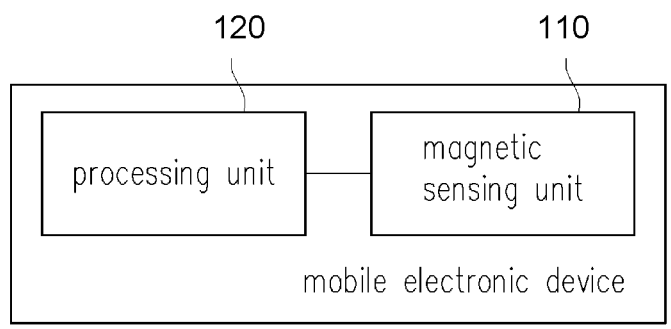
FIG. 1 illustrates a mobile electronic device in accordance with one of the exemplary embodiments of the disclosure.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a mobile electronic device in accordance with one of the exemplary embodiments of the disclosure. All components of the mobile electronic device and their configurations are first introduced in FIG. 1. The functionalities of the components are disclosed in more detail in conjunction with FIG. 2.

Referring to FIG. 1, for exemplary purposes, a mobile electronic device 100 at least includes a magnetic sensing unit 110 and a processing unit 120, where the processing unit 120 is coupled to the magnetic sensor 110. The mobile electronic device 100 could be a standalone device such as a smart phone, a tabular computer, a person digital assistant (PDA), a smart watch, and so forth. The mobile electronic device 100 could also be a non-standalone wearable device, such as a bracelet, necklace, that is paired with another standalone device via a communication unit (not shown).

The magnetic sensing unit 110 could be a geomagnetic sensor, a magnetometer, a digital compass, or other similar devices. The magnetic sensing unit 110 is configured to detect magnetic field and output a magnetic value along any one or each of multiple axes (referred to as "a component magnetic value" hereafter). The magnetic sensing unit 110 could also output a composite value (referred to as "a composite magnetic value") by combining the component magnetic values of all of the axes.

The processing unit 120 may include one or more of a North Bridge, a South Bridge, a field programmable array (FPGA), a programmable logic device (PLD), an application specific integrated circuit (ASIC), or other similar device or a combination thereof. The processing unit 120 may also include a central processing unit (CPU), a programmable general purpose or special purpose microprocessor, microcontroller, a digital signal processor (DSP), an application specific integrated circuit (ASIC), a programmable logic device (PLD), or other similar devices or a combination thereof The processing unit 120 is configured to integrate and process data obtained from the magnetic sensing unit 110.

Figure 2:
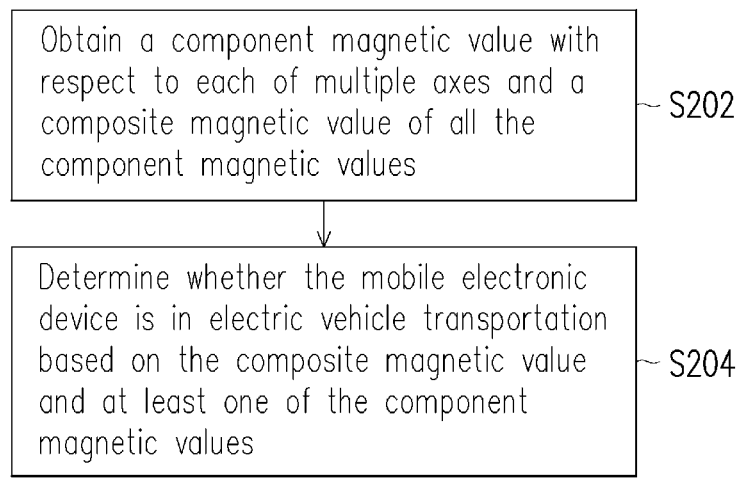
FIG. 2 illustrates a flowchart of a method for electric vehicle transportation detection in accordance with one of the exemplary embodiments of the disclosure.

FIG. 2 illustrates a flowchart of a method for electric vehicle transportation detection in accordance with one of the exemplary embodiments of the disclosure. The steps of FIG. 2 could be implemented by the proposed electronic device 100 as illustrated in FIG. 1. The concept of the proposed method is to detect whether the user of the electronic device 100 is commuting via electric vehicle transportation based on detected magnetic field. The electric vehicle transportation could include rapid transit (e.g. metropolitan railway transit (MRT) and subway), light rail (e.g. tram, streetcar, and trolley), heavy rail (e.g. high-speed rail, bullet train, magnetic levitation train, and inter-city rail) as well as electric road vehicles, surface and underwater vessels, electric aircraft, electric spacecraft, and so forth. However, the disclosure is not limited in this regard.

Referring to FIG. 1 in conjunction with FIG. 2, the processing unit 120 would obtain a component magnetic value with respect to each of multiple axes and a composite magnetic value of all the component magnetic values from the magnetic sensing unit 110 (Step S202). For exemplary purposes, assume that the magnetic sensing unit 110 is a triaxial geomagnetic sensor. The processing unit 120 would then obtain component magnetic values respectively in x, y, and z axes as well as a composite magnetic value of the three component magnetic values.

Next, the processing unit 120 would determine whether the mobile electronic device 100 is in electric vehicle transportation based on the composite magnetic value and at least one of the component magnetic values (Step S204). In detail, each of the component magnetic values would be a vector quantity with a magnitude and a direction along the corresponding axis, and the composite magnetic value would represent the strength of the magnetic field.

In the present embodiment, the processing unit 120 would determine whether the composite magnetic value is greater than a determination threshold, where the determination threshold could be set to, for example, 90 µT. As a comparison, the Earth's natural magnetic field, which everyone is constantly exposed to, has a strength of around 40 µT. The magnetic field of automobile transportation such as a bus, a taxi, a car has a strength of around 40 µT, similar to that of Earth's natural magnetic field. Thus, the composite magnetic value being greater than the determination threshold could be considered as a condition to determine whether the mobile electronic device 100 is in electric vehicle transportation.

On the other hand, it should be noted that, the magnetic field strength of household appliances could also be greater than the determination threshold. For example, the magnetic field of a hair dryer has a strength up to 2000 µT at 3 cm distance, and the magnetic field of a microwave oven has a strength up to 200 µT at 3 cm distance. To prevent this type of false alarms, the processing unit 120 would further use at least one of the component magnetic values as another condition to determine whether the mobile electronic device 100 is in electric vehicle transportation.

In detail, since the component magnetic values are vector quantities, while the mobile electronic device 100 is in electric vehicle transportation, at least one of the component magnetic values would fluctuate specifically due to the directional travelling movement, acceleration, deceleration, and turning of the electric vehicle. In one approach, the processing unit 120 could determine whether the difference between the maximum and the minimum of any of the component magnetic values is greater than a difference threshold within a predefined period of time. If yes, the fluctuation in magnetic field exists. In a more intuitive approach, the processing unit 120 could determine whether each of the component magnetic values stays in a specific range respectively for over a predefined period of time. If no, in this case, the fluctuation in magnetic field exists. Thus, at least one of the component magnetic values fluctuating could be considered as another condition to determine whether the mobile electronic device 100 is in electric vehicle transportation.

Figure 3A:
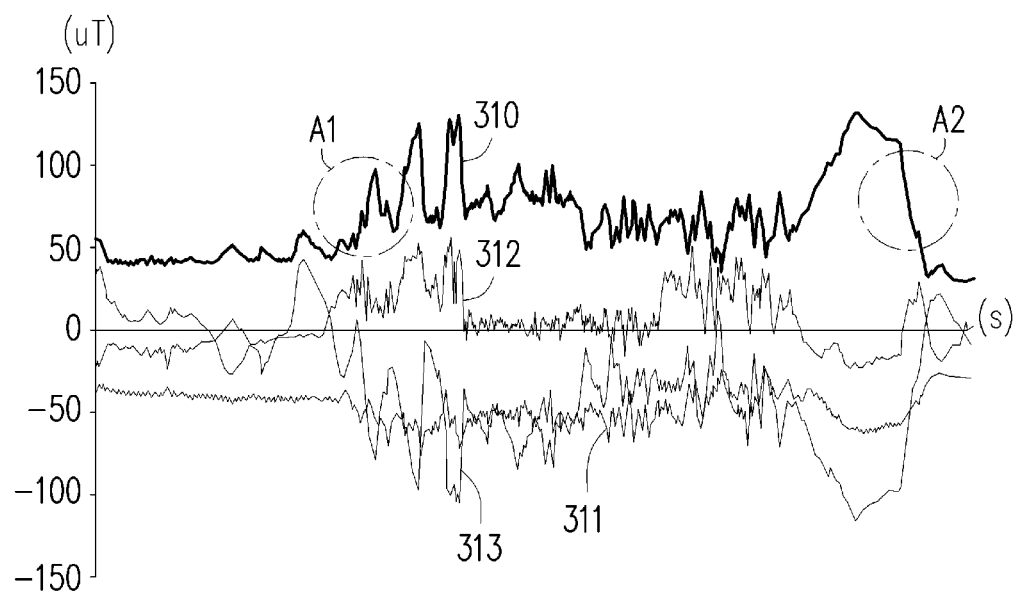
FIGS. 3A-3C illustrate three diagrams of magnetic values against time in different measuring environments according to an embodiment of the disclosure.
Figure 3B:
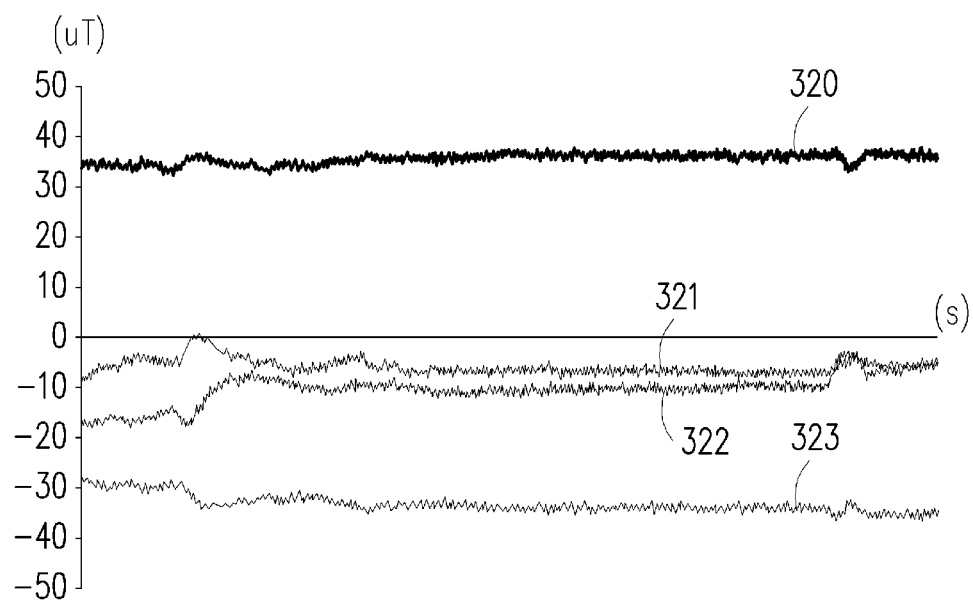
Figure 3C:
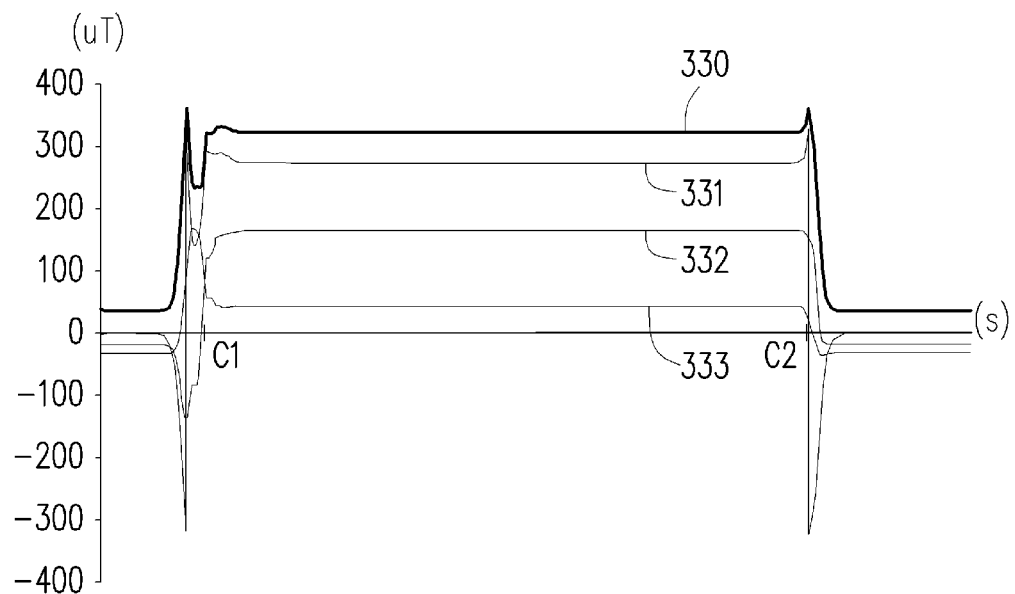

For a better understanding of the proposed method, FIGS. 3A-3C illustrate three diagrams of magnetic values against time in different measuring environments according to an embodiment of the disclosure.

Referring to FIG. 3A, curves 311, 312, and 313 represent three component magnetic values with respect to three axes collected over a period of time in a MRT, and a curve 310 represents their composite magnetic value. Since the values in the curve 310 are greater than the determination threshold (e.g. 90 µT) in a time period between time periods A1 and A2, and the curve 313 exhibits multiple fluctuations within the time period (i.e. with continuous and alternate decrement/increment of the magnetic values), in this case, the processing unit 120 would determine that the electronic device 100 is in electric vehicle transportation. Moreover, during the time period of A1, the values in the curve 310 start increasing, and this could indicate that the mobile electronic device 100 has entered the electric vehicle transportation. During the time period of A2, the values in the curve 310 start decreasing, and this could indicate that the mobile electronic device 100 has exited the electric vehicle transportation.

Referring to FIG. 3B, curves 312, 322, and 323 represent three component magnetic values with respect to three axes collected over a period of time in a bus, and a curve 320 represents their composite magnetic value. Since the values in the curve 320 is less than the determination threshold at all time points, the processing unit 120 would determine that the mobile electronic device 100 is not in electric vehicle transportation. No further determination on the three component magnetic values is required.

Referring to FIG. 3C, curves 331, 332, and 333 represent three component magnetic values with respect to three axes collected over a period of time in front of a laptop, and a curve 330 represents their composite magnetic value. The values in the curve 330 are greater than the determination threshold (e.g. 90 µT) in a time period between time point C1 and time point C2, and yet all the curves 331, 332, and 333 tend to exhibit a horizontal pattern with no prominent fluctuation. In this case, the processing unit 120 would determine that the electronic device 100 is not in electric vehicle transportation.

Figure 4:
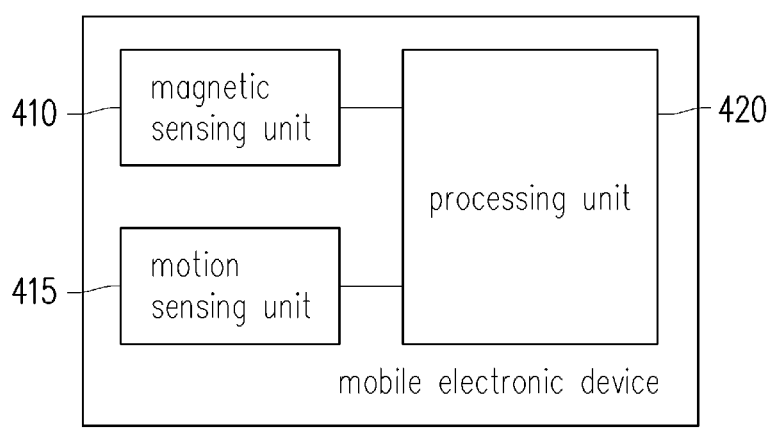
FIG. 4 illustrates a mobile electronic device in accordance with one of the exemplary embodiments of the disclosure.

FIG. 4 illustrates another mobile electronic device in accordance with one of the exemplary embodiments of the disclosure.

Referring to FIG. 4, for exemplary purposes, a mobile electronic device 400 at least includes a magnetic sensing unit 410, a motion sensing unit 415, and a processing unit 420, where the processing unit 120 is coupled to the magnetic sensing unit 410 and the motion sensing unit 415, and similar components to FIG. 1 are designated with similar numbers having a "4" prefix.

The motion sensing unit 415 may be one or a combination of an accelerometer (e.g. G-sensor), a gyroscope (e.g. gyrosensor), or any sensor that detects the linear movement, the direction of the linear movement, or the rotational movement of the mobile electronic device 400. For example, a triaxial accelerometer would output acceleration data corresponding to each axis in response to any detection of a sudden movement when the mobile electronic device 100 encounters an external force. In an embodiment, the magnetic sensing unit 410 and the motion sensing unit 415 could be integrated into a single unit. The disclosure is not limited in this regard.

Figure 5:
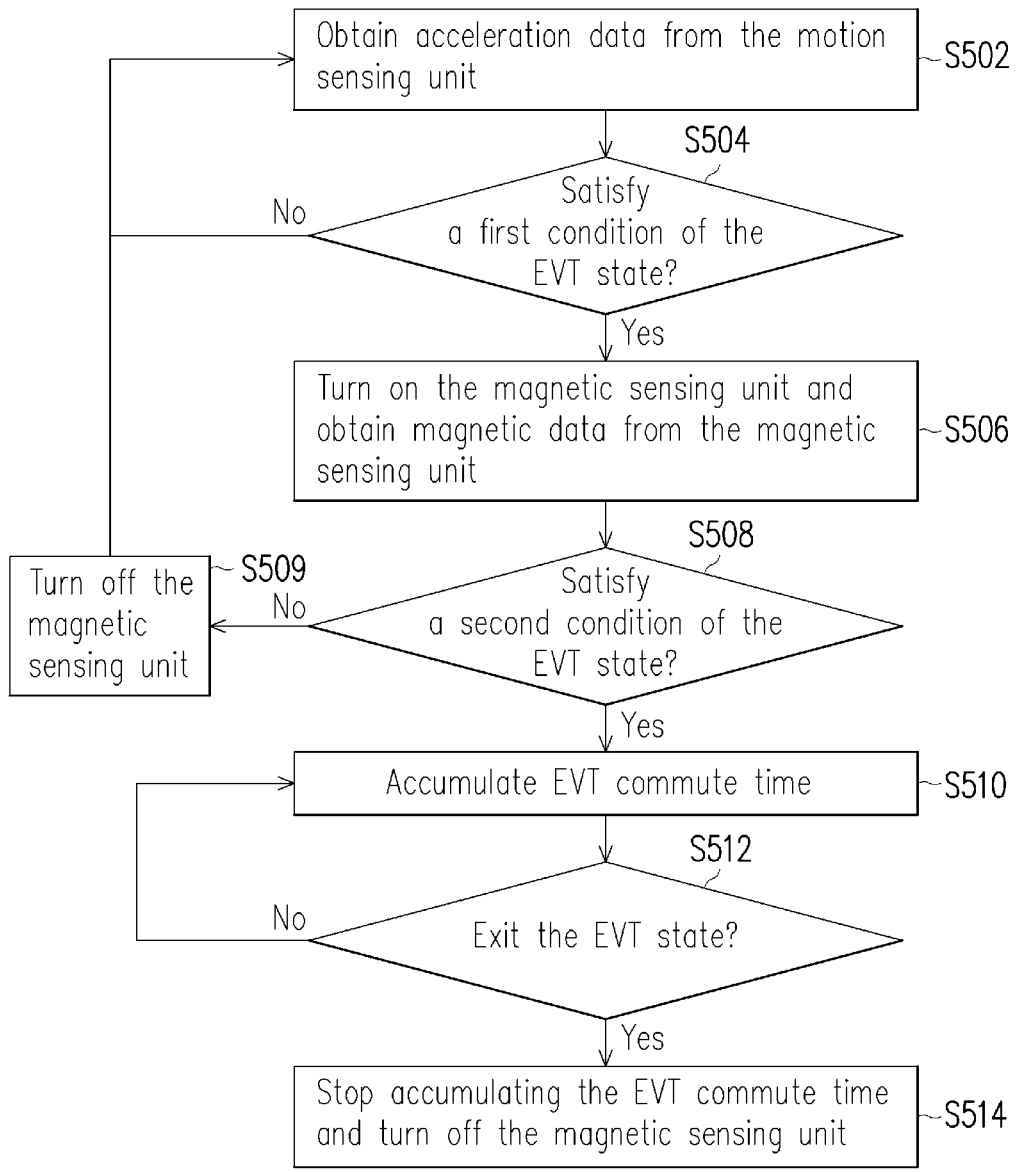
FIG. 5 illustrates a flowchart of an application scenario of a method for electric vehicle transportation detection in accordance with one of the exemplary embodiments of the disclosure.

FIG. 5 illustrates a flowchart of an application scenario of a method for electric vehicle transportation detection in accordance with one of the exemplary embodiments of the disclosure. The steps of FIG. 5 could be implemented by the proposed electronic device 400 as illustrated in FIG. 4. In this exemplary embodiment, the magnetic sensing unit 410 would not be initially turned on by default due to its considerable power consumption. The magnetic sensing unit 410 would be triggered based on the data output by the motion sensing unit 415. Hereafter, the electronic device 400 being in electric vehicle transportation is referred to as being in an EVT state.

Referring to FIG. 4 in conjunction with FIG. 5, since the magnetic sensing unit 410 typically has considerable power consumption, it would not be initially turned on by default. In a normal scenario, when the user enters, for example, a railway carriage, he would find a seat/standing spot and stay there until his destination arrives. Therefore, the processing unit 420 would first obtain acceleration data from the motion sensing unit 415 (Step S502) and determine whether the mobile electronic device 100 satisfies a first condition of the EVT state according to the acceleration data (Step S504). Herein, the first condition of the EVT state refers to the mobile electronic device 400 being in a stable condition for over a first predetermined time. In other words, the first condition of the EVT state could be interpreted as the user has already found a seat/standing spot and has been staying there for over the first predetermined time. As an exemplary approach, the processing unit 420 could simply determine whether the acceleration data is within a tolerance range for over the first predetermined time, where it indicates that the mobile electronic device 400 has a relative limited movement with respect to the moving railway carriage.

When the processing unit 420 determines that the mobile electronic device 400 does not satisfy the first condition of the EVT state, the flow returns to Step 502 such that the processing unit 420 would continuously obtain acceleration data from the motion sensing unit 415. On the other hand, when the processing unit 420 determines that the mobile electronic device 400 satisfies the first condition of the EVT state, the processing unit 420 would send a control signal to turn on the magnetic sensing unit 410 and start obtaining magnetic data from the magnetic sensing unit 410 (Step S506). It should however be noted that, the first condition merely serves as a basic check for the necessity to turn on the magnetic sensing unit 410 since there are a lot of scenarios that could satisfy the first condition of the EVT state in reality.

Next, the processing unit 420 would further determine whether the mobile electronic device 400 satisfies a second condition of the EVT state according to the magnetic data (Step S508). Herein, the magnetic data includes a component magnetic value with respect to each of multiple axes and a composite magnetic value of all the component magnetic values as described in Step S202. The second condition of the EVT state refers to the condition such that the composite magnetic value being greater than the determination threshold as well as at least one of the component magnetic values fluctuating as described in Step S204.

When the processing unit 420 determine that the mobile electronic device 400 does not satisfy the second condition of the EVT state, the processing unit 420 would turn off the magnetic sensing unit 410 (Step S509), the flow returns to Step 502 such that the processing unit 420 would continuously obtain acceleration data from the motion sensing unit 415. On the other hand, when the processing unit 420 determine that the mobile electronic device 400 satisfies the second condition of the EVT state, it indicates that the electronic device 400 is in electric vehicle transportation. At this point, in the present embodiment, the processing unit 420 would start accumulating EVT commute time (Step S510) for personal statistical purposes.

During the EVT commute time accumulation, the processing unit 420 would also determine whether the mobile electronic device 400 exits the EVT state (Step S512); that is, the user exits the railway carriage. As opposed to Step S504, when the acceleration data starts being unstable, this could indicate that the user starts moving away from the seat/standing spot, and thus the processing unit 120 would determine that the mobile electronic device 400 exits the EVT state. However, there might be a scenario where the user is merely walking around in the railway carriage. With a more rigorous perspective, the processing unit 420 could further determine that the mobile electronic device 400 exits the EVT state based on, for example, whether the composite magnetic value has dropped below the determination threshold for over a period of time.

When the mobile electronic device 400 is still in the EVT state, the flow returns to Step 510 such that the processing unit 420 would continuously accumulating the EVT commute time. When the mobile electronic device 400 exits the EVT state, the processing unit 420 would stop accumulating the EVT commute time and send a control signal to turn off the magnetic sensing unit 410 (Step S514) for power consumption saving.

In an embodiment, assume that the mobile electronic device 400 is a standalone device such as a smart phone. While the mobile electronic device 400 is determined to be in the EVT state (i.e. the user is in the railway carriage), the processing unit 420 could further adjust original settings of the mobile electronic device 400. For example, the processing unit 420 could boost in-call volume, notification volume, and so forth. Also, when the mobile electronic device 400 is determined to exit the EVT state, the processing unit 420 would save the measured EVT commute time in a data storage unit (not shown) as personal commute statistics. In another embodiment, assume that the mobile electronic device 400 is a non-standalone wearable device such as a bracelet, the processing unit 420 could transmit a notification message to its paired device such as a smart phone via a communication unit (not shown), and the paired smart phone would further adjust original settings of itself. Also, the processing unit 420 would transmit the measured EVT commute time to its paired device for storage.

Figure 6:
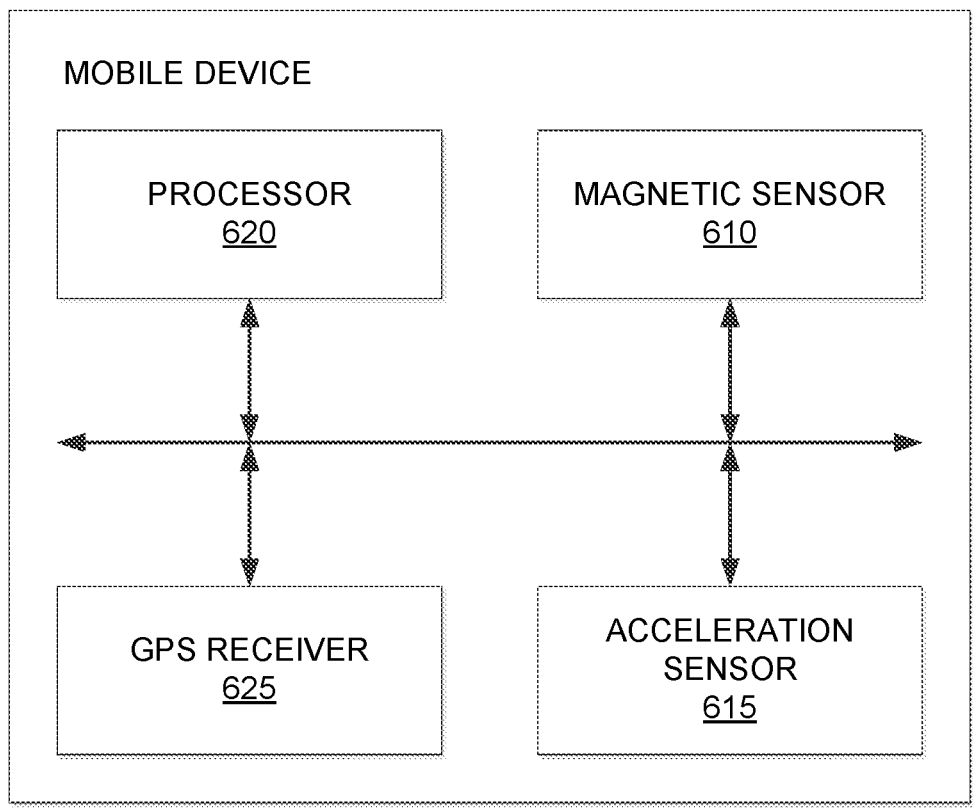
FIG. 6 illustrates another embodiment of a mobile device.

FIG. 6 illustrates another embodiment of a mobile device. In particular, mobile device 600 at least includes a magnetic sensing unit (magnetic sensor) 610, a motion sensing unit (accelerometer sensor) 615, and a GPS receiver 625, each of which communicates with a processing unit (processor) 620. Magnetic sensor 610, which includes sensor circuitry, is configured to generate magnetism signals corresponding to sensed magnetism. Accelerometer sensor 615, which includes accelerometer circuitry, is configured to generate acceleration signals corresponding to sensed acceleration. GPS receiver 625, which includes receiver circuitry, is configured to generate GPS signals corresponding to a GPS location of mobile device 600.

Owing to the operating characteristics (e.g., power consumption) of the various components, it is desirable in some embodiments to turn off one or more of the components when their use is not considered necessary. By way of example, since a magnetic sensor and a GPS receiver may consume power at a relatively high rate compared to that of an accelerometer sensor, it may be desirable to turn off the magnetic sensor and/or the GPS receiver if one or more of various criteria are met. It should be noted that, as used herein, the term "turn off" may include operating the component in a power-saving mode (e.g., a mode in which signals are not requested from the component), in addition to discontinuing power to the component.

In this regard, processor 620, which includes processor circuitry, is configured to determine a status of the mobile device and control power to one or more components based on the determined status. In some embodiments, processor 620 is configured to determine whether the mobile device is in a moving vehicle (designated as an in-moving-vehicle status), in a moving electric vehicle (designated as an in-moving-electric-vehicle status), or not in a moving vehicle (designated generally as a not-in-a-moving-vehicle status (e.g., a walking, jogging, or bicycling status)). It should be noted that various assumptions may be made regarding an electric vehicle for determining the status of in-moving-electric-vehicle. By way of example, an electric train, which may operate for prolonged periods below ground, may be a type of electric vehicle of interest using the descriptions that follow. Notably, while operating below ground, information from GPS may not be available. Processor 620 can be a micro-controller, which is connected to or embedded in an application processor, for example.

In order to determine the appropriate status, processor 620 is configured to determine whether GPS locations, based on the GPS signals from GPS receiver 625, are indicative of the mobile device moving. If the GPS locations are not indicative of moving, processor 620 determines whether the sensed magnetism corresponds to a predetermined magnetism threshold based on a set of the magnetism signals from magnetic sensor 610. Notably, if the mobile device is in a moving electric vehicle, the sensed magnetism may correspond to (e.g., exceed) the predetermined magnetism threshold, in which case processor 620 sets a current status of the mobile device to an in-moving-electric-vehicle status, and turns off the GPS receiver and the magnetic sensor.

Figure 7:
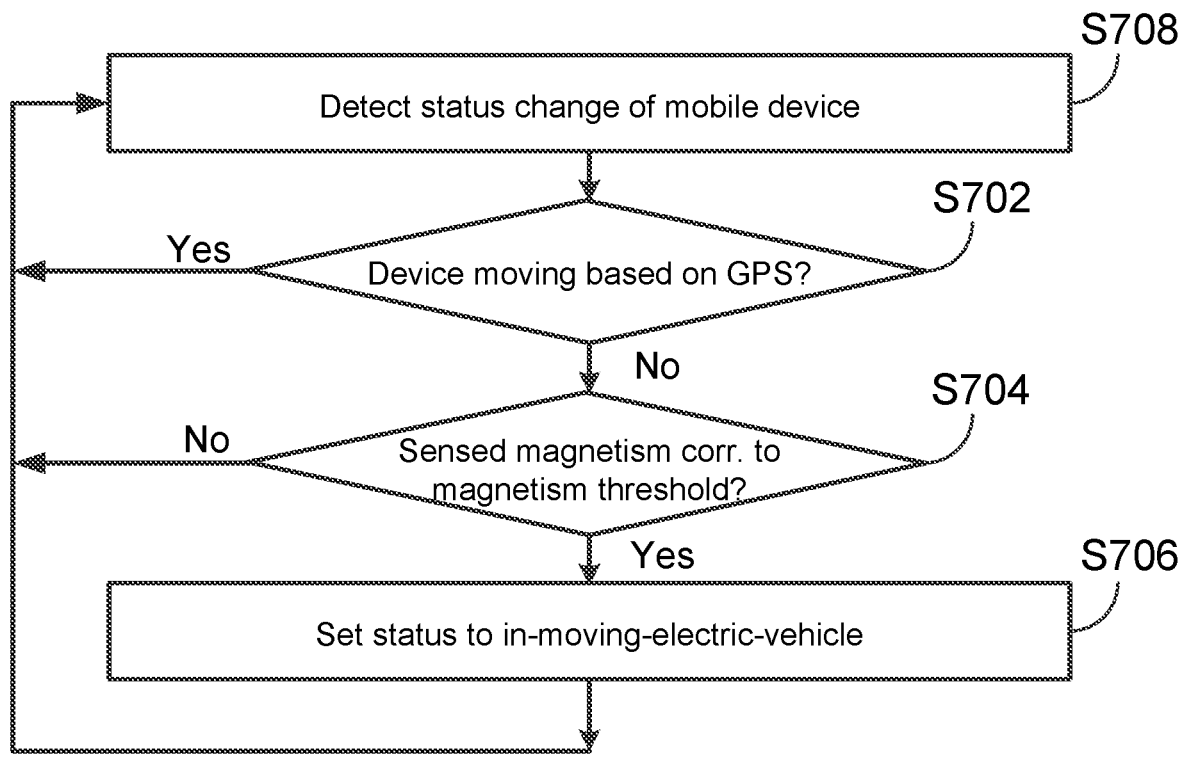
FIG. 7 is a flowchart depicting another embodiment of a method for electric vehicle transportation detection.

FIG. 7 is a flowchart depicting another embodiment of a method for electric vehicle transportation detection such as may be implemented by a mobile device (e.g., mobile device 600 of FIG. 6). As shown in FIG. 7, the method 700 may be construed as beginning at block S702, in which a determination is made as to whether GPS locations, based on GPS signals from the GPS receiver, are indicative of the mobile device moving. If the GPS locations are not indicative of the mobile device moving, the process proceeds to block S704, in which a determination is made as to whether sensed magnetism corresponds to a predetermined magnetism threshold. If the sensed magnetism corresponds to the predetermined magnetism threshold, the process proceeds to block S706, in which a status of the mobile device is set to an in-moving-electric-vehicle status. Notably, the GPS receiver and the magnetic sensor also are turned off, which enables a power-saving of the mobile device. Thereafter, or in the alternative process flows from blocks S702 and S704, the process may proceed to block S708. In block S708, if a change in status is detected, the process returns to block S702.

Figure 8:
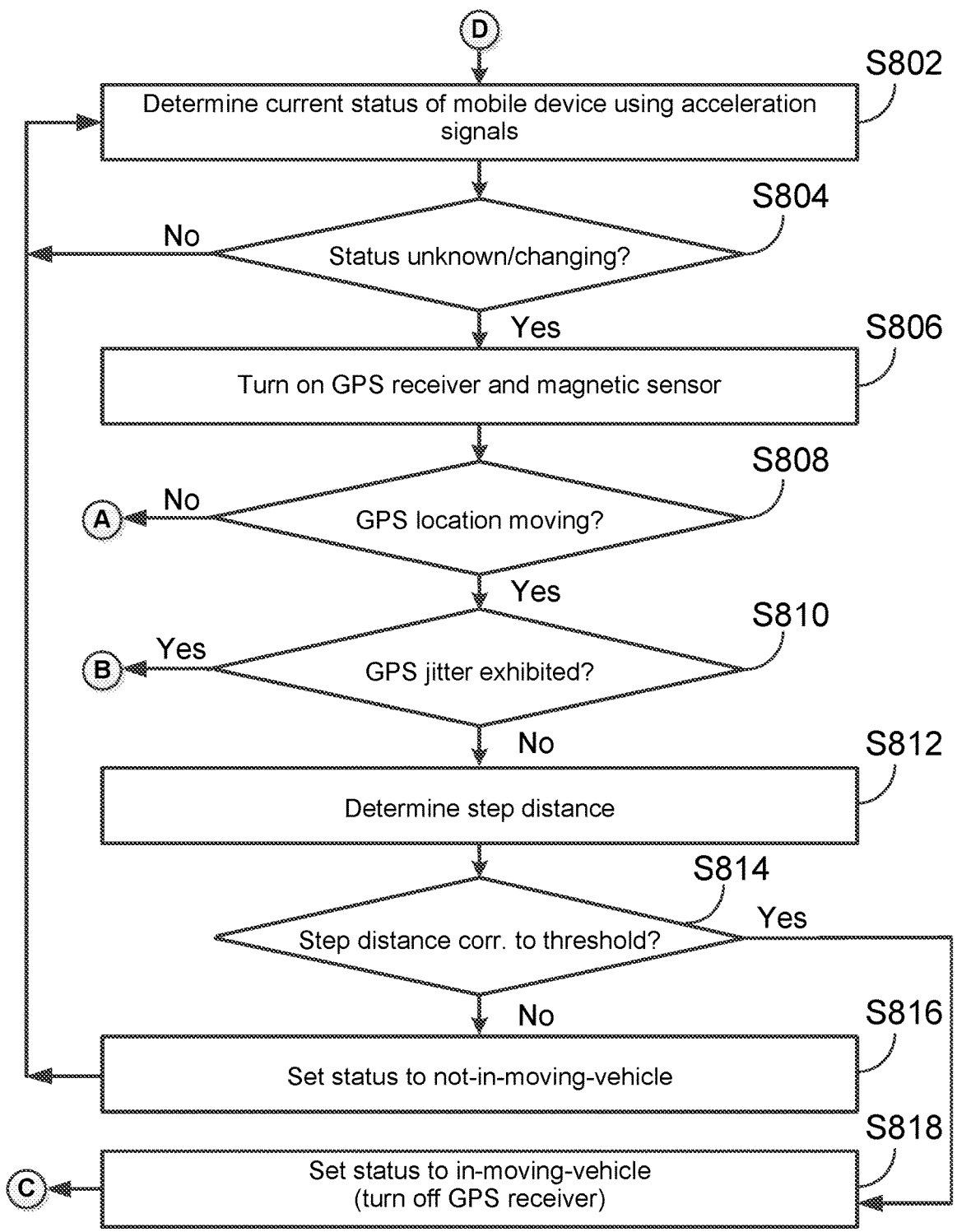
FIGS. 8 and 9 are flowcharts depicting another embodiment of a method for electric vehicle transportation detection.
Figure 9:
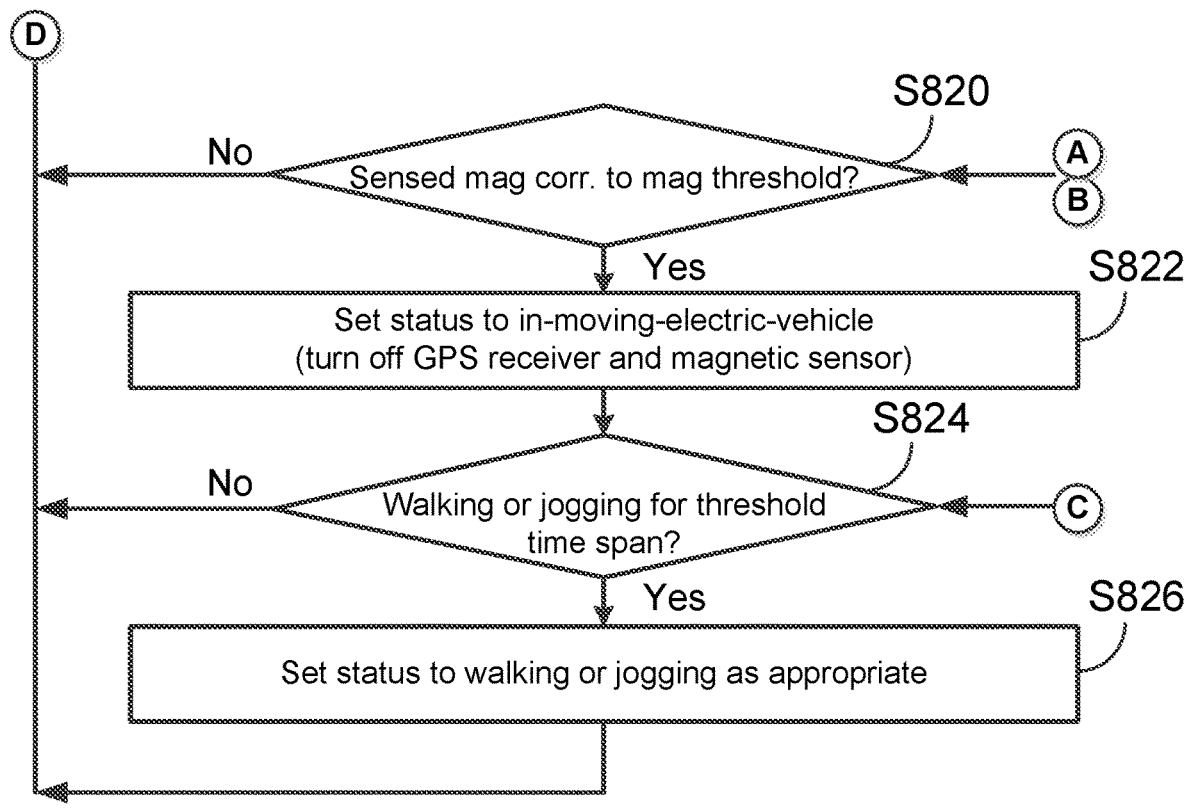

FIGS. 8 and 9 depicting a flowchart of another embodiment of a method for electric vehicle transportation detection such as may be implemented by a mobile device. As shown in FIG. 8, the method 800 may be construed as beginning at block S802, in which a current status of a mobile device is determined using acceleration signals from an acceleration sensor. In block S804, a determination is made regarding whether a status of the mobile device is unknown and/or changing. If it is determined that the status is unknown and/or changing, the process proceeds to block S806, in which a GPS receiver and a magnetic sensor of the mobile device are turned on. Based on GPS signals from the GPS receiver, a determination is then made (S808) as to whether GPS locations are indicative of the mobile device moving. If the GPS locations are not indicative of the mobile device moving, the process proceeds to block S810, in which a determination is made regarding the presence of GPS jitter. In some embodiments, determining whether an acceptable level of GPS jitter is exhibited may be determined by evaluating the difference between consecutive GPS locations to determine location variance between the consecutive samples. This may be performed over a period of time (e.g., 6 seconds). In some embodiments, this period of time may also correspond to a status detection time. The variance in the consecutive locations then may be compared to a constant to determine whether the variance is acceptable or excessive.

If an acceptable level of GPS jitter (e.g., no GPS jitter) is exhibited over the period of time (in this case, the status detection time), the previous status is retained and the process advances to block S812, in which step distance is determined. Then, a determination is made is block S814 as to whether the step distance corresponds to a step-distance threshold. If so, the process proceeds to block S816, in which the status is set to in-moving-vehicle; however, if not, the process proceeds to block S818, in which the status is set to not-in-moving-vehicle and the GPS receiver is turned off After blocks S816 and S818, the process may return to block S802. Note that additional portions of the method, including the "No" branch from S808 and the "Yes" branch from S810, will be described with respect to FIG. 9.

As shown in FIG. 9, the "No" branch from S808 and the "Yes" branch from S810 both terminate at block S820, in which a determination is made as to whether sensed magnetism corresponds to a predetermined magnetism threshold. If the sensed magnetism corresponds to the predetermined magnetism threshold, the process proceeds to block S822, in which a status of the mobile device is set to an in-moving-electric-vehicle status. Notably, the GPS receiver and the magnetic sensor also are turned off, which enables a power-saving of the mobile device. Thereafter, the process proceeds to block S824, in which a determination is made regarding whether acceleration signals are indicative of walking or jogging. It should be noted that this determination also is made subsequent to setting a status of the mobile device to in-moving-vehicle in block S818. In block S824, if walking status or the jogging status is determined and continues over a threshold time span, the process proceeds to block S826, in which the current status of the mobile device is set to the determined walking status or the determined jogging status. Thereafter, the process proceeds to block S802, which may also occur with respect to the "No" branches associated with blocks S820 and S824.

Figure 10:
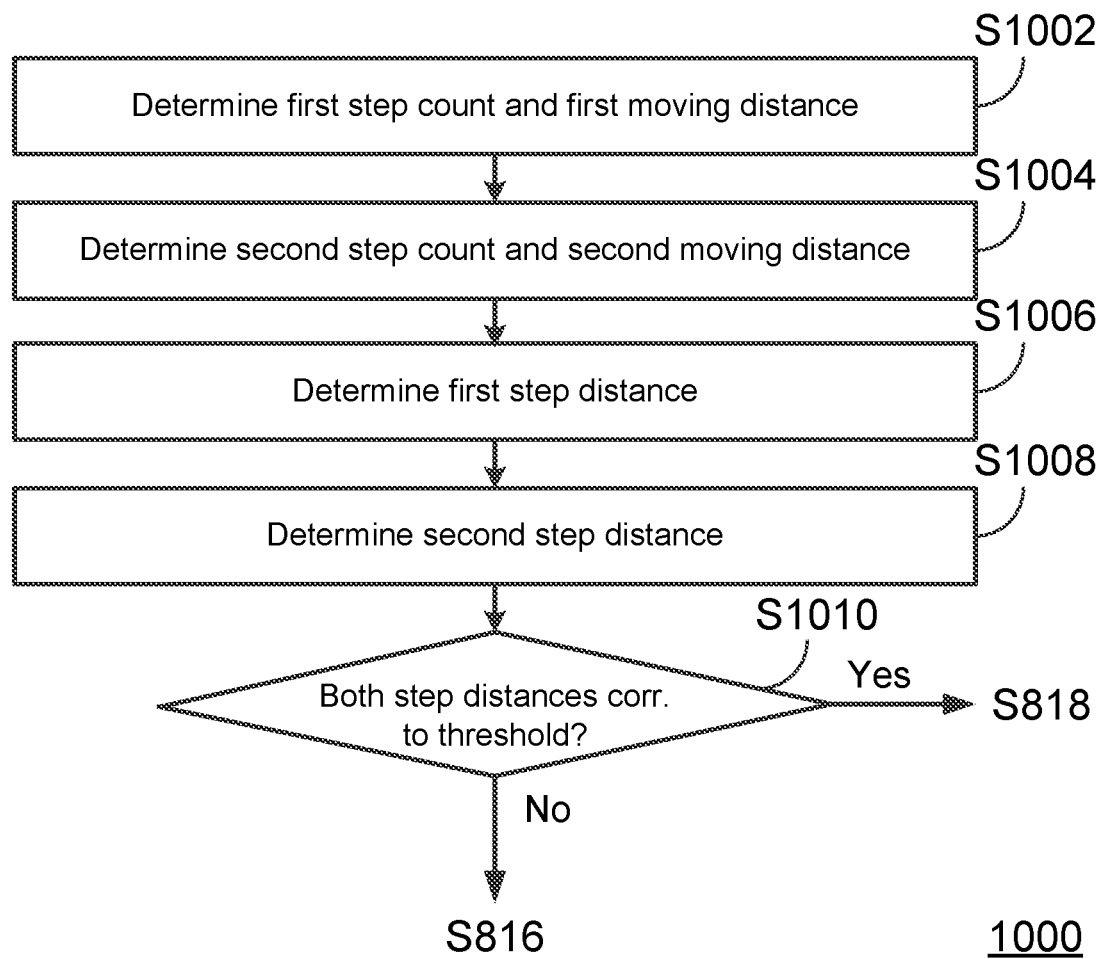
FIG. 10 is a flowchart depicting an embodiment associated with determining step distance.

With respect to determining the step distance (block S812 of FIG. 8), an embodiment of a method 1000 depicting this functionality is depicted in FIG. 10. As shown in FIG. 10, method 1000 may be construed as beginning at block S1002, in which a first step count and a first moving distance are determined over a first time span (e.g., a 6 second time span) based on acceleration signals and a first set of the GPS signals, respectively. In block S1004 a second step count and a second moving distance are determined over a second time span (e.g., a 6 second time span) based on acceleration signals and a second set of the GPS signals, respectively. In this embodiment, the second time span is a time span subsequent to the first time span. In blocks S1006 and S1008, a first step distance and a second step distance are respectively determined. Notably, in some embodiments, the determined step distance is an average step distance calculated during the corresponding time period. Specifically, average step distance=moving distance during time span/step count during time span (e.g., 6 seconds). By using an average step distance, it may be possible to filter unwanted movements of the user caused by the user intermittently changing body position. It should be noted that an unreasonably large step distance may be caused by various errors, such as GPS location drift. Using sensed magnetism as described tends to filter these errors.

Figure 11:
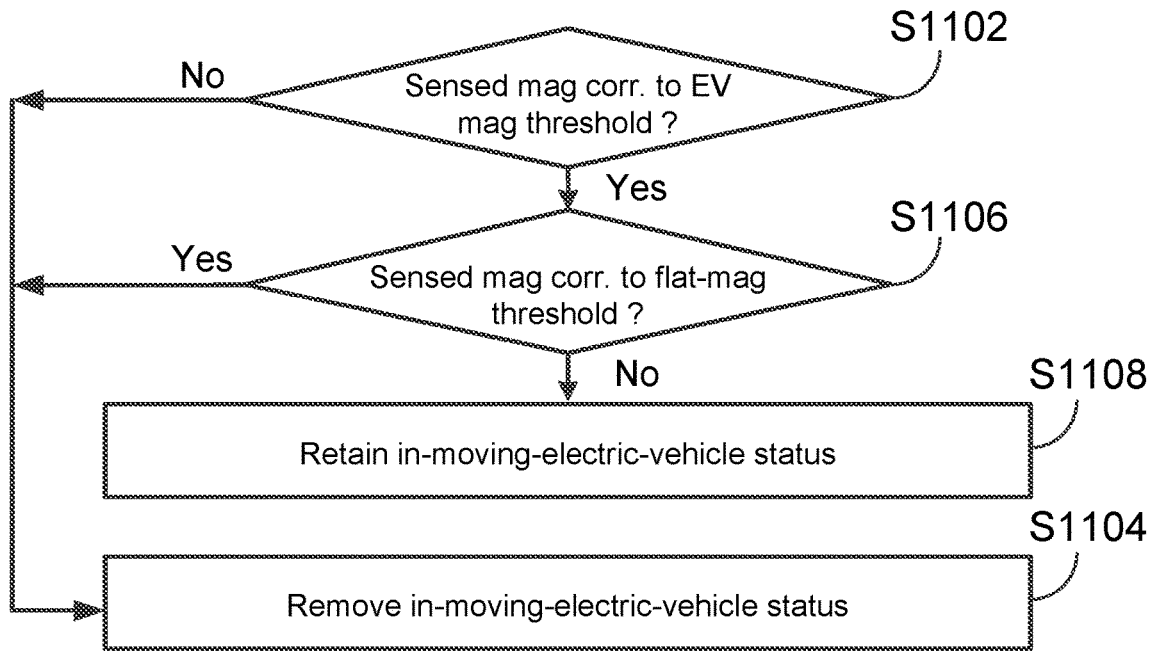
FIG. 11 is a flowchart depicting an embodiment associated with use of a predetermined magnetism threshold.

With respect to determining whether the sensed magnetism corresponds to a predetermined magnetism threshold (block S820 of FIG. 9), an embodiment of a method 1100 depicting this functionality is depicted in FIG. 11. As shown in FIG. 11, method 1100 may be construed as beginning at block S1102, in which a determination is made regarding whether the sensed magnetism corresponds to (e.g., is equal to or greater than) an electric vehicle (EV) magnetism threshold (i.e., a first predetermined magnetism threshold) for an electric vehicle time duration. If it is determined that the sensed magnetism does not correspond to the electric vehicle magnetism threshold for the electric vehicle time duration, a previous status is retained. In this situation, the in-moving-electric-vehicle status is removed (or, if applicable, not used) as depicted in block S1104. If, however, it is determined that the sensed magnetism corresponds to the electric vehicle magnetism threshold for the electric vehicle time duration, the process proceeds to block S1106, in which a determination is made as to whether the sensed magnetism corresponds to a flat-magnetism threshold (i.e., a second predetermined magnetism threshold) for a flat-magnetism time duration. In this regard, if the mobile device is placed near a DC power source (e.g., within a backpack near the DC power source of a tablet computer), the magnetism waveform sensed by the magnetism sensor may be relatively flat as the influence of the DC power source may tend to dominate the detection. As such, if the sensed magnetism corresponds to (e.g., is less than) the flat magnetism threshold for the flat-magnetism time duration, the process may return to block S1104 as described before. However, if the sensed magnetism does not correspond to the flat-magnetism threshold for the flat-magnetism time duration, the in-moving-electric-vehicle status is retained (or, as applicable, is used) (S1108). Notably, the flat-magnetism time duration is longer than the electric vehicle time duration.

Figure 12:
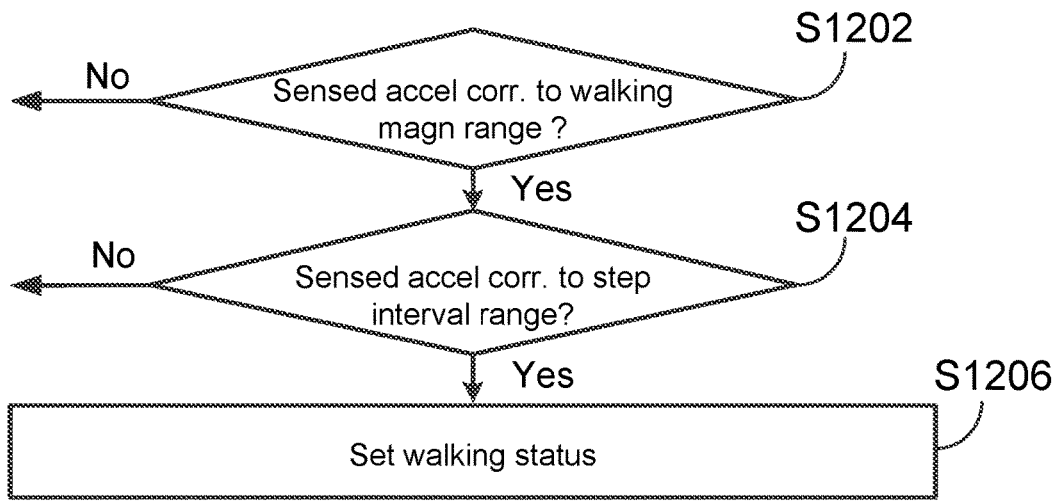
FIG. 12 is a flowchart depicting an embodiment associated with determining current status of a mobile device.

With respect to determining a current status of the mobile device (block S802 of FIG. 8), an embodiment of a method 1200 depicting this functionality is depicted in FIG. 12. As shown in FIG. 12, method 1200 may be construed as beginning at block S1202, which may occur after a status of the mobile device is set to "not-in-moving vehicle" (block S818 in FIG. 8). In this embodiment, a determination is made in S1202 regarding whether sensed accelerations correspond to a walking magnitude range. Specifically, recorded maxima and minima (i.e., peaks) of the sensed accelerations are compared to the walking magnitude range (e.g., an absolute value) to determine whether these peaks appear to be associated with walking accelerations. If the sensed accelerations correspond to the walking magnitude range, the process proceeds to block S1204, in which a determination is made as to whether the sensed accelerations correspond to a stepping interval range. In particular, the stepping interval range is associated with a step frequency for walking, but should be set less than a frequency threshold associated with jogging. If, in block S1204, it is determined that the sensed accelerations correspond to the stepping interval range, the status of the mobile device is set to "walking" (S1206). Notably, if the determination is negative in either of blocks S1202 or S1204, the process may proceed to block S804 of FIG. 8, for example.

The disclosure also provides a non-transitory computer readable medium, which records computer program to be loaded into a mobile electronic device to execute the steps of the proposed method in some embodiments. The computer program is composed of a plurality of program instructions (for example, an organization chart, establishing program instruction, a table approving program instruction, a setting program instruction, and a deployment program instruction, etc), and these program instructions are loaded into the mobile electronic device and executed by the same to accomplish various steps of the proposed method.

No element, act, or instruction used in the detailed description of disclosed embodiments of the present application should be construed as absolutely critical or essential to the disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A mobile device, comprising:
an accelerometer sensor, having accelerometer circuitry, configured to generate acceleration signals corresponding to sensed acceleration;
a GPS receiver, having receiver circuitry, configured to generate GPS signals; and
a processor, having processor circuitry, configured to:
determine that GPS locations, based on the GPS signals, are indicative of the mobile device moving;
receive the acceleration signals from the accelerometer;
determine a first step distance over a first time span based on the acceleration signals and the GPS signals;
determine a second step distance over a second time span based on the acceleration signals and the GPS signals, the second time span being subsequent to the first time span;
determine whether the first step distance and the second step distance correspond to a predetermined step-distance threshold such that, if both of the first step distance and the second step distance correspond to the predetermined step-distance threshold, the processor sets the status of the mobile device to an in-moving-vehicle status indicative of the mobile device being located in a vehicle that is moving;
determine whether the acceleration signals are indicative of predetermined status types, the predetermined status types including at least one of static, walking, jogging, or bicycling, wherein, to determine whether the acceleration signals are indicative of one of the predetermined status types, the processor is configured to determine whether the sensed acceleration corresponds to a corresponding magnitude range and to a stepping interval range;
determine whether a current status of the mobile device has changed or the current status is indeterminate as one of the predetermined status types; and if the current status has changed or is indeterminate, turn on the GPS receiver to determine whether that GPS locations are indicative of the mobile device moving.

2. The mobile device of claim 1, wherein the processor is further configured to turn off the GPS receiver in response to the in-moving-vehicle status.

3. The mobile device of claim 1, wherein, in determining the step distance, the processor is further configured to:
determine a first step count and a second step count, based on the acceleration signals associated with the first time span and the second time span, respectively;
determine the first step distance based on the first step count and a first moving distance based on the GPS signals over the first time span; and
determine the second step distance based on the second step count and a second moving distance based on the GPS signals over the second time span.

4. A mobile device, comprising:
an accelerometer sensor, having accelerometer circuitry, configured to generate acceleration signals corresponding to sensed acceleration;
a GPS receiver, having receiver circuitry, configured to generate GPS signals; and
a processor, having processor circuitry, configured to:
determine that GPS locations, based on the GPS signals, are indicative of the mobile device moving;
receive the acceleration signals from the accelerometer;
determine a first step distance over a first time span based on the acceleration signals and the GPS signals;
determine a second step distance over a second time span based on the acceleration signals and the GPS signals, the second time span being subsequent to the first time span;
determine whether the first step distance and the second step distance correspond to a predetermined step-distance threshold such that, if both of the first step distance and the second step distance correspond to the predetermined step-distance threshold, the processor sets the status of the mobile device to an in-moving-vehicle status indicative of the mobile device being located in a vehicle that is moving;
wherein the processor is further configured to determine, when a previous status was set to the in-moving-vehicle status, whether the acceleration signals are indicative of the walking or the jogging status, such that if the walking status or the jogging status is determined and continues over a threshold time span, the processor sets the current status of the mobile device to the determined walking status or the determined jogging status.

5. A mobile device, comprising:
an accelerometer sensor, having accelerometer circuitry, configured to generate acceleration signals corresponding to sensed acceleration;
a GPS receiver, having receiver circuitry, configured to generate GPS signals; and
a processor, having processor circuitry, configured to:
determine that GPS locations, based on the GPS signals, are indicative of the mobile device moving;
receive the acceleration signals from the accelerometer;
determine a first step distance over a first time span based on the acceleration signals and the GPS signals;
determine a second step distance over a second time span based on the acceleration signals and the GPS signals, the second time span being subsequent to the first time span;
determine whether the first step distance and the second step distance correspond to a predetermined step-distance threshold such that, if both of the first step distance and the second step distance correspond to the predetermined step-distance threshold, the processor sets the status of the mobile device to an in-moving-vehicle status indicative of the mobile device being located in a vehicle that is moving;
wherein:
the mobile device further comprises a magnetic sensor, having sensor circuitry, configured to generate magnetism signals corresponding to sensed magnetism; and
the processor further configured to determine whether the sensed magnetism corresponds to an electric vehicle magnetism threshold for an electric vehicle time duration to set an in-moving-electric-vehicle status indicative of the mobile device being located in an electric vehicle that is moving.

6. The mobile device of claim 5, wherein the processor is further configured to:
determine that GPS locations, based on the GPS signals, are not indicative of the mobile device moving;
determine whether the sensed magnetism corresponds to a flat magnetism threshold for a flat-magnetism time duration;
retain a previous status if the sensed magnetism corresponds to the flat magnetism threshold for the flat-magnetism time duration; and
set the in-moving-electric-vehicle status if the sensed magnetism does not correspond to the flat magnetism threshold for the flat-magnetism time duration;
wherein the flat-magnetism time duration is longer than the electric vehicle time duration.

7. The mobile device of claim 5, wherein the processor is further configured to:
determine whether differences in GPS location over a status detection time, including the first time span and the second time span, correspond to a GPS location jitter threshold;
if the differences do not correspond to the GPS location jitter threshold, the first step distance and the second step distance are presumed valid and the previous status is retained; and
if the differences correspond to the GPS location jitter threshold, determine, based on the set of the magnetism signals, whether the sensed magnetism corresponds to the predetermined magnetism threshold such that, if the sensed magnetism corresponds to the predetermined magnetism threshold, the processor further sets the status of the mobile device to the in-moving-electric-vehicle status.

8. A method for electric vehicle transportation detection, adapted to a mobile device having an accelerometer sensor and a GPS receiver, the method comprising:
determining whether GPS locations, based on GPS signals from the GPS receiver, are indicative of the mobile device moving;
receiving the acceleration signals from the accelerometer;
determining a first step distance over a first time span based on the acceleration signals and the GPS signals;

determining a second step distance over a second time span based on the acceleration signals and the GPS signals, the second time span being subsequent to the first time span;

determining whether the first step distance and the second step distance correspond to a predetermined step-distance threshold such that, if both of the first step distance and the second step distance correspond to the predetermined step-distance threshold, the processor sets the status of the mobile device to the in-moving-vehicle status indicative of the mobile device being located in a vehicle that is moving;

determining whether the acceleration signals are indicative of predetermined status types, the predetermined status types including at least one of static, walking, jogging, or bicycling; wherein determining whether the acceleration signals are indicative of predetermined status types further comprises determining whether the sensed acceleration corresponds to a corresponding magnitude range and to a stepping interval range;

determining whether a current status of the mobile device has changed or the current status is indeterminate as one of the predetermined status types; and if the current status has changed or is indeterminate, turning on the GPS receiver to determine whether that GPS locations are indicative of the mobile device moving.

9. The method of claim 8, further comprising turning off the GPS receiver in response to the in-moving-vehicle status.

10. The method of claim 8, wherein determining the step distance further comprises:

determining a first step count and a second step count, based on the acceleration signals associated with the first time span and the second time span, respectively;

determining the first step distance based on the first step count and a first moving distance based on the GPS signals over the first time span; and determining the second step distance based on the second step count and a second moving distance based on the GPS signals over the second time span.

11. A method for electric vehicle transportation detection, adapted to a mobile device having an accelerometer sensor and a GPS receiver, the method comprising:

determining whether GPS locations, based on GPS signals from the GPS receiver, are indicative of the mobile device moving;

receiving the acceleration signals from the accelerometer;

determining a first step distance over a first time span based on the acceleration signals and the GPS signals;

determining a second step distance over a second time span based on the acceleration signals and the GPS signals, the second time span being subsequent to the first time span;

determining whether the first step distance and the second step distance correspond to a predetermined step-distance threshold such that, if both of the first step distance and the second step distance correspond to the predetermined step-distance threshold, the processor sets the status of the mobile device to the in-moving-vehicle status indicative of the mobile device being located in a vehicle that is moving;

determining, when a previous status was set to the in-moving-vehicle status, whether the acceleration signals are indicative of the walking or the jogging status; and if the walking status or the jogging status is determined and continues over a threshold time span, setting the current status of the mobile device to the determined walking status or the determined jogging status.

12. A method for electric vehicle transportation detection, adapted to a mobile device having an accelerometer sensor and a GPS receiver, the method comprising:

determining whether GPS locations, based on GPS signals from the GPS receiver, are indicative of the mobile device moving;

receiving the acceleration signals from the accelerometer;

determining a first step distance over a first time span based on the acceleration signals and the GPS signals;

determining a second step distance over a second time span based on the acceleration signals and the GPS signals, the second time span being subsequent to the first time span;

determining whether the first step distance and the second step distance correspond to a predetermined step-distance threshold such that, if both of the first step distance and the second step distance correspond to the predetermined step-distance threshold, the processor sets the status of the mobile device to the in-moving-vehicle status indicative of the mobile device being located in a vehicle that is moving;

wherein:

the mobile device further comprises a magnetic sensor, having sensor circuitry, configured to generate magnetism signals corresponding to sensed magnetism; and the method further comprises determining whether the sensed magnetism corresponds to an electric vehicle magnetism threshold for an electric vehicle time duration to set an in-moving-electric-vehicle status indicative of the mobile device being located in an electric vehicle that is moving.

13. The method of claim 12, further comprising:

determining that GPS locations, based on the GPS signals, are not indicative of the mobile device moving;

determining whether the sensed magnetism corresponds to a flat magnetism threshold for a flat-magnetism time duration;

retaining a previous status if the sensed magnetism corresponds to the flat magnetism threshold for the flat-magnetism time duration; and setting the in-moving-electric-vehicle status if the sensed magnetism does not correspond to the flat magnetism threshold for the flat-magnetism time duration;

wherein the flat-magnetism time duration is longer than the electric vehicle time duration.

14. The method of claim 12, further comprising:

determining whether differences in GPS location over a status detection time, including the first time span and the second time span, correspond to a GPS location jitter threshold;

if the differences do not correspond to the GPS location jitter threshold, retaining the first step distance and the second step distance;

if the differences correspond to the GPS location jitter threshold, determining, based on the set of the magnetism signals, whether the sensed magnetism corresponds to the predetermined magnetism threshold; and if the sensed magnetism corresponds to the predetermined magnetism threshold, setting the status of the mobile device to the in-moving-electric-vehicle status.

* * * * *